March 27, 1945.  A. M. JESS  2,372,278
COFFEE CONTAINER AND MEASURE
Filed March 7, 1944
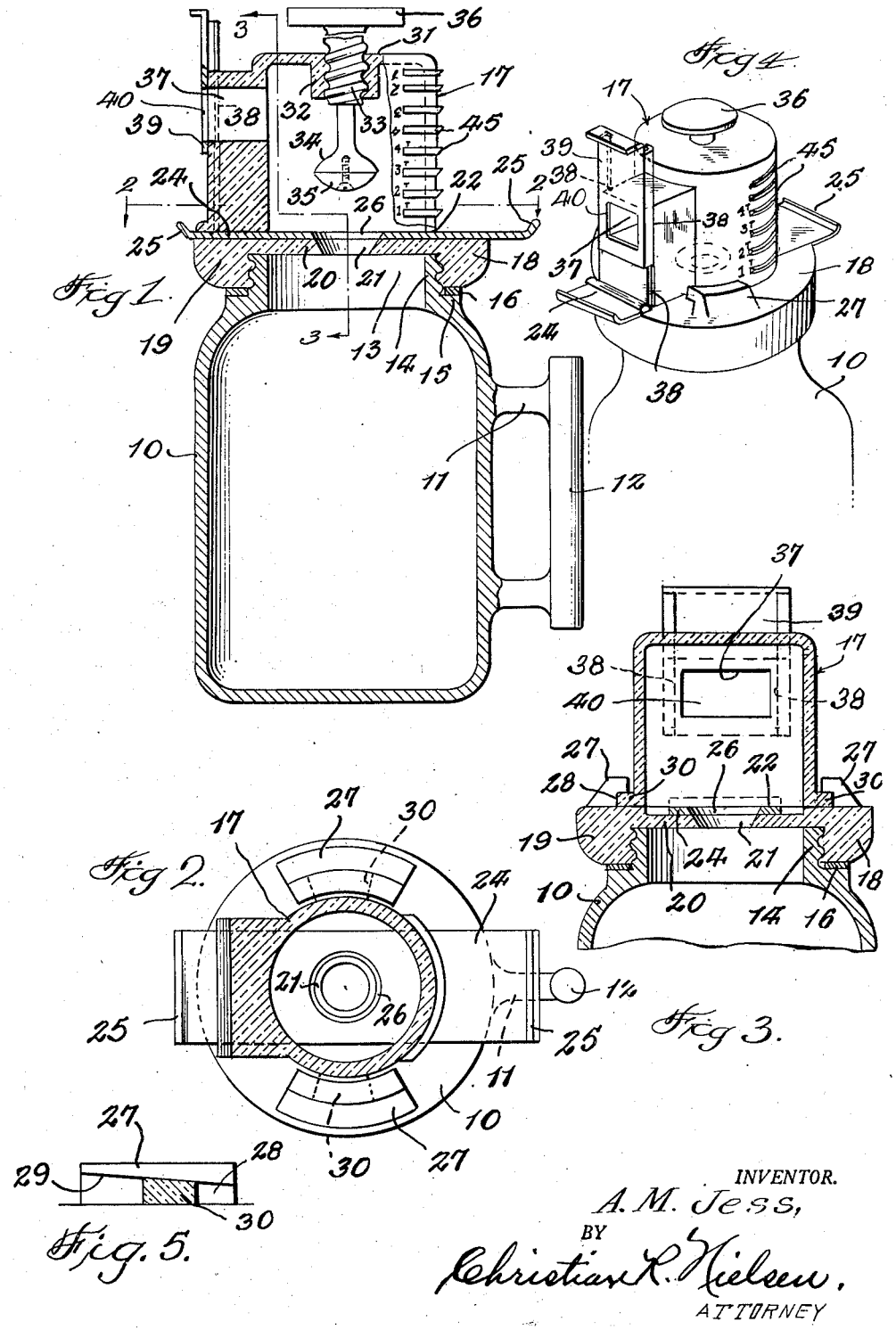
INVENTOR.
A. M. Jess,
BY
Christian R. Nielsen,
ATTORNEY Patented Mar. 27, 1945

2,372,278

UNITED STATES PATENT OFFICE 2,372,278

COFFEE CONTAINER AND MEASURE

Alexander M. Jess, Portland, Oreg.

Application March 7, 1944, Serial No. 525,369

3 Claims. (Cl. 222—158)

The invention has for an object to provide an effective container and seal for ground coffee, so that it may be preserved from the access of air, and whereby, when a quantity is to be used for making a given number of cups of coffee, the necessary quantity of ground coffee may be measured in a part of the container by suitable manipulations, and sealed off from the main portion of the contents, so that the measured part may be discharged into a coffee percolator or the like.

An important aim of the invention is to present such a construction adapted to be made in glass or transparent castings, and so constructed that in the measuring operations the entire container and the measuring means may be kept sealed and the measuring operations carried out without exposing the ground coffee to the surrounding air excessively, and without liability of spilling or waste.

Another important aim of the invention is to provide a device which is extremely simple in its construction and manner of operation, so that there will be a minimum liability of derangement or difficulty in manipulation of the device to effect the desired functions.

Another important aim of the invention is to present a measure element as a part of my container which is adapted to be readily removed from the main container body or to permit its mounting upon a new container, in case of breakage.

A further aim is to present an embodiment of the measure device for my invention which can also be applied to common Mason type jars, as an alternative to the particular container device illustrated herein.

Additional objects, advantages and features of invention will be readily understood from the following description and accompanying drawing, wherein Figure 1 is a vertical sectional view of a container and measure device constructed in accordance with my invention, Figure 2 is a cross section on the line 2—2 of Figure 1, Figure 3 is a fragmentary vertical section on the line 3—3 of Figure 1.

Figure 4 is a perspective view of the top portion only of the measure and receptacle.

Figure 5 is a schematic view illustrating the connection between measuring receptacle and base cover.

There is illustrated a base receptacle 10, which is adapted to be formed of glass or transparent molded plastic material, which in the present instance approximates the form of an ordinary preserving jar, with the exception that an integral handle 11 is shown formed on one side of the receptacle, including a gripping portion 12 which extends longitudinally of the receptacle and approximately parallel to the axis of the receptacle.

The jar has a large mouth 13, around which an externally threaded neck portion 14 is formed, and at the base of the neck a shoulder 15 circumscribing the receptacle is indicated, substantially horizontal, and having a common jar rubber or other elastic or cushion gasket 16, substantially as shown. Screwed upon the threads of the neck 14 there is a measure chamber 17, in the form of an inverted cup which is separably attached to a base cover plate 18, both of these parts being adapted to be made of plastic, or glass, but it is preferable that the base piece may be made of a plastic, if the part 17 is made of glass, in order to avoid glass to glass contact, which is more liable to breakage than contacting pieces of glass and plastic. In the present instance the cap 18 is formed with a recess on the bottom side, so that a thick wall portion 19 is constituted, interiorly threaded to fit the threads of the neck 14, and so proportioned that when screwed down thereupon, the gasket or rubber 16 will be compressed by the under side of the wall portion 19. A top or head portion 20 remains, extending entirely across the base, and having a central opening 21 therethrough. The inverted cup portion 17 has a planiform lower edge adapted to be set flat upon the top plate portion 20, but has diametrically opposite recesses or slots 22 of low altitude but considerable width formed in the lower edge thereof, so that when set upon the plate portion 20 the slots are formed between the plate portion 20 and the relieved edge portion of the cup. Pressed slidably in this slot, there is a shutter or gate plate 24, having upturned ends 25 adapted to engage against the cup at respective limits of movement of the plate, this plate having a circular aperture 26 therethrough, adapted to aline with the opening 21 at one limit of movement of the sliding, this plate having a circular aperture 26 therethrough adapted to aline with the opening 21 at one limit of movement of the sliding gate, and adapted to be spaced from said opening when the slide is at the opposite limit of its movement. The base cover 18 is provided at opposite sides with upstanding lugs 27, curved concentrically with the axis of the receptacle and cup 17, and spaced so as to receive the lower edge portion of the inverted cup therebetween, substantially as shown in Figure 2. On the inner sides of these lugs, grooves or slots 28 are formed, the upper sides of which are inclined, as at 29, in Figure 5, and on the base or lip portion of the cup diametrically opposite inclined flanges 30 are formed, adapted to engage in the slots 28 by rotation of the cup after presentation between the lugs. The parts 30 are so located that when wedged against the surface 29 of the lugs, the cup will be in proper position with the slot and slide as will be hereinafter explained, although, if desired, the parts may be arranged so that the slide will extend on a different radius from the cup. The cup is formed with a top or head portion 31, having a depending interior neck 32 and interior threaded axial opening extending through the neck, and receiving a correspondingly threaded stem 33, of a stopper 34 which consists of a circular head of a size and shape adapted to engage concentrically in or over the opening 21 and close the same hermetically, when desired, the stopper head having an under facing of rubber or the like. In order to permit this stopper to engage properly in the opening 21, the opening 26 of the slide 24 is sufficiently large, and both openings are conical in form with the larger parts presented upwardly, thus adapting the stopper to seat in the opening 21 readily.

The upper end of the stem 33 is provided with an operating handle 36 by which the stopper stem may be rotated to move the stopper downwardly or upwardly, as desired. At one side of the cup wall a lateral integral discharge spout or duct 37 is formed, which in the present instance is substantially rectangular in cross section, opening from the inner wall of the cup and opening flush on the outer end of the duct in a smooth plane normal to the longitudinal direction in the duct. Grooves 38 are formed transversely up the upper and lower sides of the duct near its extremity, and parallel to the end surface, and a gate closure 39 is provided, consisting of a simple rectangular plate having a bottom portion that is planiform and laid flat against the end of the duct 37 and of a length approximately twice the width of the duct, one-half of the plate having an opening 40 therethrough adapted to aline with the passage through the duct 37 at one position of the plate, as will appear. The upper and lower edge portions of the plate 39 are bent at right angles inwardly toward the duct, and then inwardly toward each other sufficiently to set into the grooves 38, slidably, so as to hold the plate snugly against the end of the duct 37 and slidable for movement from one limit to the other. As before indicated, in one position the opening 40 will aline with the duct, and at the opposite extreme of sliding movement of the plate 39 its unbroken area will close the end of the duct. The inturned flanges of the plate engage with moderate friction in the grooves 38, so as to hold the plate yieldingly at either limit of its movement.

In the use of this device, a purchase of coffee is introduced into the container 10, after removal of the screw cover base 18, and then the cover base 18 replaced and screwed down on the jar rubber 16. The slide 24 being drawn to open position, the stopper 37 is screwed downwardly until its cushioned under side seats snugly in the opening 21, thereby sealing the receptacle completely with the contents preserved from deterioration by loss of volatile materials and aroma. When it is desired to use a portion of the contents for brewing the beverage, the knob 36 is manipulated to withdraw the stopper 34 a distance substantially as shown in Figure 1, and the gate 39 being in closed position, the entire receptacle and measuring chamber 17 inverted, permitting a quantity of the ground coffee from the receptacle 10 to sift into the chamber 17. A series of circumscribing ribs 45 are formed around the chamber body 17, spaced longitudinally thereon, and its faces between the outermost of these are marked with inverted numerals to indicate the number of table-spoons or cup measures of coffee that have been discharged into the measure chamber 17, while in the spaces between the lowermost ribs, corresponding numbers which are erect on the device as viewed in Figure 1 when it is in position with the measure chamber 17 at the top, are formed. While inverted when a suitable quantity of coffee is indicated in the receptacle 17 by the normally inverted numbers, the slide 24 is pushed so as to close the opening 20 instantly, and if desired, the accuracy of the measurement may be checked by then setting the entire article in erect position, and observing those ribs adjacent the top level of the measured material when the measure is shaken so as to level the contents properly. When satisfied as to the correct amount of material measured, the gate 39 is pushed to open position, as shown in Figure 4, and then the entire article tilted so that the contents of the measuring chamber 17 will run out through the duct 37 into the percolator or other coffee making device into which it is desired to discharge the measured coffee. As soon as the measured material has been discharged, the entire device is returned to erect position, the slide 24 moved to open position, as shown in Figure 1, and the stopper 34 operated by the knob 36 in a direction to screw it down into the opening 21 again, and the gate 39 is again moved to closed position, as shown in Figure 1. The device may then be set upon the shelf until another time when more of the beverage is to be brewed, when the operation previously described may be repeated.

While I have disclosed my invention with great particularity, in the best form known to me, it will nevertheless, be understood that this is purely exemplary, and that various modifications in the construction, arrangement and combination of parts, substitutions of materials and equivalents, mechanical or otherwise, may be made without departing from the spirit of the invention except as may be more specifically indicated in the appended claims, wherein I claim:

1. A measuring receptacle for detachable connection with a storage receptacle comprising a cover member having a port centrally thereof, and a measuring receptacle upon the outer side thereof, in receiving relation with said port, means for closing said port comprising a slide having an orifice larger than the port, and a separately operable longitudinally movable stopper mounted in said measuring receptacle to engage in said port for sealing thereof in one position of the slide.

2. The structure of claim 1 in which said measuring receptacle is transparent and measuring scale elements formed thereon.

3. The structure of claim 1 in which said stopper includes a threaded shank operatively engaged through the top wall of the measuring receptacle and terminates in an operating handle.

ALEXANDER M. JESS.